(12) United States Patent
Camisasca (10) Patent No.: US 10,035,475 B2
(45) Date of Patent: Jul. 31, 2018

(54) LICENSE PLATE MOUNTING SYSTEM (71) Applicant: CAMISASCA AUTOMOTIVE MANUFACTURING, INC., Lake Forest, CA (US)

(72) Inventor: Henry P. Camisasca, Lake Forest, CA (US)

(73) Assignee: Camisasca Automotive Manufacturing, Inc., Lake Forest, CA (US)

( * ) Notice: Subject to any disclaimer, the term of this patent is extended or adjusted under 35 U.S.C. 154(b) by 53 days.

(21) Appl. No.: 15/143,405

(22) Filed: Apr. 29, 2016

(65) Prior Publication Data

US 2016/0318463 A1 Nov. 3, 2016

Related U.S. Application Data (60) Provisional application No. 62/156,103, filed on May 1, 2015.

(51) Int. Cl.
*B60R 13/10* (2006.01)
(52) U.S. Cl.
CPC ................... *B60R 13/105* (2013.01)
(58) Field of Classification Search
CPC .................................................. B60R 13/105
USPC .......................................................... 40/209
See application file for complete search history.

(56) References Cited

U.S. PATENT DOCUMENTS

| | | | |
|---|---|---|---|
| 1,660,575 A * | 2/1928 | Overton | B60R 13/105 40/209 |
| 1,995,984 A * | 3/1935 | Hudson | B60R 13/105 40/209 |
| 2,831,281 A | 4/1958 | Nayman | |
| 2,921,395 A | 1/1960 | Fishman | |
| 3,304,642 A | 2/1967 | Dardis | |
| 4,037,342 A | 7/1977 | Bott | |
| 4,314,417 A | 2/1982 | Cain | |
| 4,805,331 A * | 2/1989 | Boggess | G09F 7/22 211/59.2 |
| 4,819,355 A | 4/1989 | Solow | |
| 4,891,895 A | 1/1990 | DeLaquil, Jr. | |
| 5,870,841 A | 2/1999 | Brody, II et al. | |
| 7,415,787 B2 | 8/2008 | Eidsmore | |
| 7,877,908 B2 | 2/2011 | Collins | |
| 2005/0210721 A1* | 9/2005 | Blackburn | A47G 3/00 40/209 |
| 2006/0230651 A1* | 10/2006 | Eidsmore | B60R 13/105 40/201 |
| 2008/0098629 A1 | 5/2008 | Graham et al. | |
| 2010/0101123 A1* | 4/2010 | Pacleb | B60R 13/105 40/209 |
| 2011/0252676 A1* | 10/2011 | Stringer | B60D 1/60 40/210 |

* cited by examiner

*Primary Examiner* — Kristina N Junge
(74) *Attorney, Agent, or Firm* — Knobbe, Martens, Olson & Bear, LLP (57) ABSTRACT

A license plate mounting system for a vehicle is provided. The mounting system can comprise an outer frame and a backing plate. The outer frame and backing plate assembly can be configured to receive and maintain a license plate. The outer frame can include a plurality of tabs and slots to engage with the backing plate. The backing plate can include a plurality of tabs and recesses to engage with the outer frame.

26 Claims, 9 Drawing Sheets

LICENSE PLATE MOUNTING SYSTEM

CROSS-REFERENCE TO RELATED APPLICATIONS

This application claims the benefit of U.S. Provisional Patent Application No. 62/156,103, titled LICENSE PLATE MOUNTING SYSTEM, filed May 1, 2015, which is hereby incorporated by reference herein in its entirety.

BACKGROUND

Field

The present disclosure relates to license plate mounting systems. In particular, the present disclosure relates to license plate mounting systems for a motorcycle, which is usable with multiple license plate mounting standards. The present disclosure also relates to license plate mounting systems for automotive or other vehicle use.

Description of the Related Art

Many types of license plate frames, enclosures and other arrangements exist to protect and secure plates to vehicles. However, existing license plate mounting arrangements are only useful and legal on a limited amount of US license plates due to the numerous variations in license plate sizes, mounting hole, and registration tag locations. The existing mounting arrangements require multiple model numbers to address a significant number of these DMV registration compliant issues and mounting standards. Thus causing increased manufacturing and inventory cost to cover the range of vehicles and State license plates.

SUMMARY

The systems, methods and devices described herein have innovative aspects, no single one of which is indispensable or solely responsible for their desirable attributes. Without limiting the scope of the claims, some of the advantageous features will now be summarized.

As described above, motorcycle license plate mounting hole sizes and locations can vary from state to state. In some configurations, the disclosed mounting system is capable of accommodating the mounting standards of at least 47 states. To accomplish this, the mounting system comprises a backing plate and a frame. The backing plate includes oversized holes (relative to at least some of the fastener sizes used) at a designated spacing, as described further herein. Other arrangements that can accommodate multiple hole sizes or spacings, such as L-slots or T-slots, for example, can also be used. The outer frame connects to the backing plate with a tool-less connection, such that no fastener heads are visible outside of the frame.

In some configurations, one or both of an upper edge and a lower edge of the backing plate includes a pair of raised tabs with a pair of recesses next to the respective tab. The raised tabs engage slots in the upper end or lower end of the outer frame. The recesses provide access openings for a screwdriver or other tool to allow removal of the outer frame from the backing plate. In some alternative configurations, the outer frame can include tabs on one or both of the upper end and the lower end that engage the upper or lower edge of the backing plate. In some configurations, a compensating element or a biasing element, such as a spring, can be positioned between the backing plate and the license plate to allow for different thicknesses of mounting hardware that will be used to mount the backing plate to the vehicle. In addition the biasing element will help eliminate vibration between license plate and the frame by exerting a force tending to move the license plate forward into the frame cavity.

In some configurations, a license plate mounting system includes a backing plate having an upper plate edge comprising at least one raised tab and at least one recess disposed adjacent to the at least one raised tab. The backing plate also has a lower plate edge having at least one raised tab and at least one recess disposed adjacent to the at least one raised tab. A plurality of holes each configured to receive a fastener are provided in the backing plate. A biasing element is supported by the backing plate. An outer frame has an upper frame edge comprising at least one slot configured to receive the at least one raised tab of the upper edge of the backing plate. The outer frame has a lower frame edge comprising at least one slot configured to receive the at least one raised tab of the lower edge of the backing plate. The biasing element is configured in use to apply a force to a license plate positioned between the backing plate and the outer frame, the force tending to move the license plate toward a front wall of the outer frame.

In some configurations, the biasing element comprises a bumper projecting outwardly from the backing plate.

In some configurations, the biasing element comprises neoprene foam.

In some configurations, the biasing element extends across a front surface of the backing plate.

In some configurations, the biasing element is offset from a central horizontal axis of the backing plate.

In some configurations, the biasing element is coupled to the backing plate by one or more fasteners.

In some configurations, the biasing element comprises a spring mechanism.

In some configurations, the outer frame comprises a uniform width.

In some configurations, the lower frame edge of the outer frame further comprises an extension portion, wherein the extension portion extends inwardly towards an interior of the outer frame from the lower frame edge.

In some configurations, the extension portion further comprises a recess configured to receive a display plate.

In some configurations, the extension portion further comprises a display plate configured to display information.

In some configurations, a license plate mounting system includes a backing plate having an upper plate edge and a lower plate edge. The upper plate edge includes at least one raised tab and at least one recess disposed adjacent to the at least one raised tab. The backing plate includes a plurality of holes each configured to receive a fastener. A biasing element is supported by the backing plate. An outer frame includes an upper frame edge and a lower frame edge. The upper frame edge includes at least one slot configured to receive the at least one raised tab of the upper edge of the backing plate. The lower frame edge includes at least one frame tab spaced rearwardly from a front wall of the outer frame. The at least one frame tab is configured to receive the backing plate and the license plate disposed between the front wall of the outer frame and the backing plate. The biasing element is configured in use to apply a force to a license plate positioned between the backing plate and the outer frame, the force tending to move the license plate toward the front wall of the outer frame.

In some configurations, the biasing element comprises a bumper projecting outwardly from the backing plate.

In some configurations, the biasing element comprises neoprene foam.

In some configurations, the biasing element extends across a front surface of the backing plate and is offset from a central horizontal axis of the backing plate.

In some configurations, the outer frame comprises a uniform width.

In some configurations, the lower frame edge of the outer frame further comprises an extension portion, wherein the extension portion extends inwardly towards an interior of the outer frame from the lower frame edge.

In some configurations, the extension portion further comprises a recess configured to receive a display plate.

In some configurations, the extension portion further comprises a display plate configured to display information.

In some configurations, the at least one frame tab comprises a pair of frame tabs spaced from one another in a width direction of the outer frame.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIGS. 1A-3E illustrate a license plate mounting system 10 that is especially well-suited for use in mounting license plates of varying mounting standards, such as those presently in use in the United States. However, the concepts and features disclosed herein can also be used with, or modified for use with, other types of mounting standards, other types of license plates or mounting of other plate-like objects. In particular, the disclosed systems can be useful for mounting motorcycle and/or automotive license plates in the US, Europe or other countries/regions. In general, the system 10 comprises the backing plate 12 and an outer cover or frame 14 that is connectable to the backing plate 12.

Figure 1A:
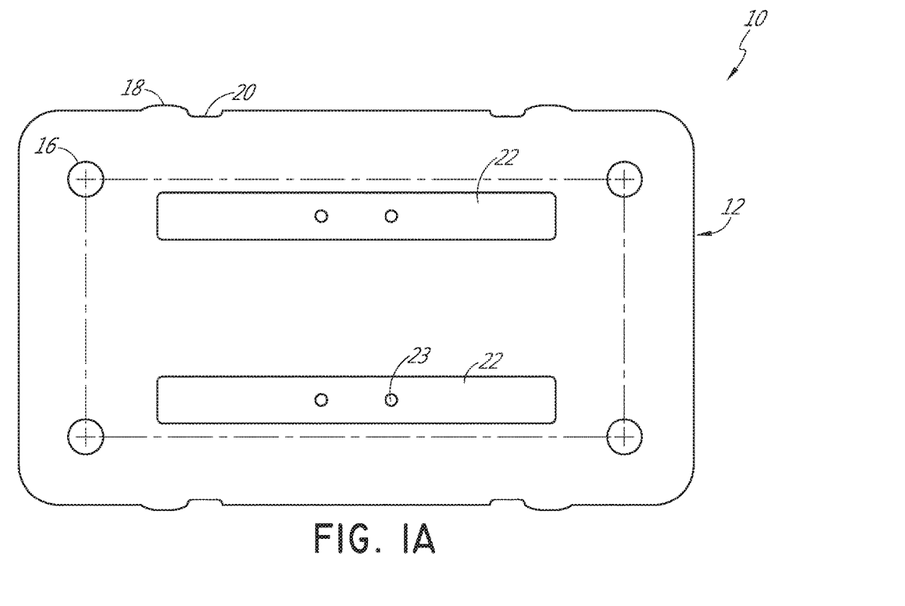
FIG. 1A is a front view of a backing plate of a license plate mounting system.
Figure 1B:
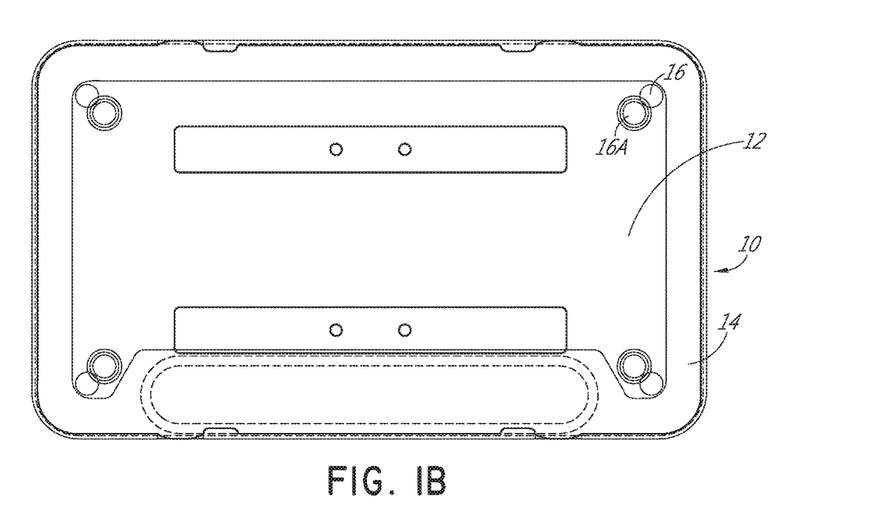
FIG. 1B is a front view of a license plate mounting system including the backing plate of FIG. 1A and an outer frame.

FIGS. 1A-1D illustrate several views of the backing plate 12 of the plate mounting system 10. The backing plate 12 preferably is substantially the same size or slightly larger than the license plate(s) with which the system 10 is configured for use. The backing plate 12 can be made of one or more materials, such as stainless steel, plastic, polymer, 304 Grade stainless steel, Black ABS Hair Cell Plastic, and/or aluminum, among other materials that are suitable for complying with industry standards, withstanding various weather conditions, increasing durability, and decreasing cost. The backing plate 12 can comprise a thickness of 0.0625, 0.125, 0.1875, 0.250, 0.3125, 0.4375, and/or 0.50 or more inches, for example. The backing plate 12 comprises one or more mounting holes 16 that allow the backing plate 12 to be mounted to one or more license plate mounting standards. In the illustrated arrangement, the backing plate 12 includes four mounting holes 16; however, in other arrangements, other numbers of mounting holes 16 can be provided. For example, in some configurations, the backing plate 12 could be configured to be mounted to less than all of the available mounting holes, such as two holes (e.g., an upper pair or a lower pair), for example. In other arrangements, as illustrated in FIG. 1B, the backing plate 12 can comprise more than four mounting holes 16, 16A. Such an arrangement can allow the mounting system 10 to accommodate a greater number of mounting standards than a version with a lesser number of mounting holes 16.

In some configurations, the mounting holes 16 are oversized relative to a fastener size of one or more mounting standards that are accommodated by the system 10. In some configurations, the mounting holes 16 can be 0.5 inches in diameter. In other configurations, mounting holes 16 can be 0.1, 0.2, 0.3, 0.4, 0.6, 0.7, 0.8, 0.9 and/or 1.0 or more inches in diameter. The mounting holes 16 can be tapered. For example, mounting holes 16 can comprise a diameter that is larger towards the front of the backing plate 12 and that decreases as the mounting hole extends towards the rear of the backing plate 12.

The backing plate 12 can be secured to a vehicle by any number of suitable fasteners. For example, the fasteners can comprise screws and/or rivets, among others, that are the same as or similar to those normally used for mounting a license plate to the relevant vehicle. However, in other configurations, the mounting holes 16 may be specific to a particular vehicle or license plate and, thus, may not be oversized relative to the fastener used. Each of the fasteners can include a same or varying length. The length of the fasteners can depend on the depth of the backing plate mounting hardware in some instances.

The illustrated backing plate 12 includes engagement features, such as one or more tabs 18. As illustrated in FIG. 1B, the tabs 18 can be configured to engage corresponding or complementary features of the outer frame 14. The illustrated tabs 18 project from a peripheral edge of the backing plate 12 and lie in the same plane. However, in other arrangements, the tabs 18 could project at an angle from the plane defined by the backing plate (or by another reference plane, such as the license plate held by the system 10). In some embodiments, the backing plate 12 can include at least two tabs 18 disposed along a top edge of the backing plate 12. In some embodiments, the backing plate 12 can include at least two tabs 18 disposed along the bottom edge of the backing plate 12. And yet other embodiments, the backing plate 12 can include at least two tabs 18 disposed on either side of the backing plate 12. Some embodiments of the backing 12 can three, four, five, six, seven, eight, nine, or 10 or more tabs along any edge of the backing plate 12.

In the illustrated embodiment, the backing plate 12 also includes a recess 20 associated with each of the tabs 18. Preferably, the recess 20 can be located close to or adjacent to the associated tab 18. The recess 20 can provide access to a tool, which can assist in disassembly of the outer frame 14 from the backing plate 12. The tab(s)18 and recess(es) 20 extend above and below, respectively, of an edge of the backing plate 12 in a region outside of the tab 18 or recess 20.

In some configurations, the backing plate 12 includes a compensating arrangement configured to occupy some of or all of any excess space between the backing plate 12 and the outer frame 14. Such space could be present because of different thicknesses in the backing plate mounting hardware (e.g., the heads of the screws) held between the backing plate 12 and the outer frame 14 or as a result of different thicknesses in the license plates and/or manufacturing variations in backing plate 12 and/or outer frame 14 materials. The compensating arrangement can reduce or eliminate relative movement or rattling of the backing plate 12, outer frame 14 and license plate held by the system 10.

Figure 1C:
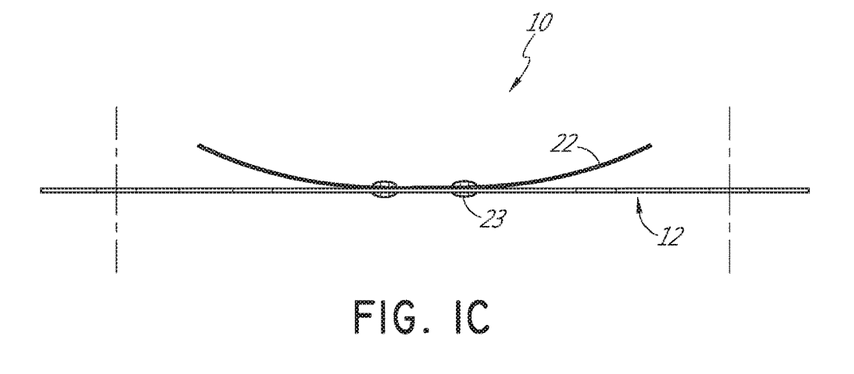
FIG. 1C is a top view of the backing plate of FIG. 1A, which includes an embodiment of a biasing element of the license plate mounting system.

FIG. 1C illustrates a top view of an example of the compensating arrangement. In the illustrated configuration, the compensating arrangement comprises at least one compensating element, such as a biasing element 22. In some configurations, the biasing element 22 is a spring, such as a leaf spring. In the illustrated arrangement, the spring 22 has a curved shape and is secured to the backing plate 12 by a suitable fastener 23 or fasteners 23, such as one or more rivets or screws, for example. In the illustrated arrangement, the spring 22 is secured to the backing plate 12 along a center or intermediate portion of the spring 22. Thus, with such an arrangement, the spring 22 can contact a rear surface of the license plate and apply a force tending to move the license plate forward towards the outer frame 14. In such an arrangement, the spring 22 can deflect a certain distance to apply the force. In some embodiments, the spring 22 can be made of spring steel and/or other material that can be deflected and apply a biasing force. The spring 22 can comprise any suitable thickness, such as 0.005, 0.010, 0.015, 0.020, or more inches thick.

Figure 1D:
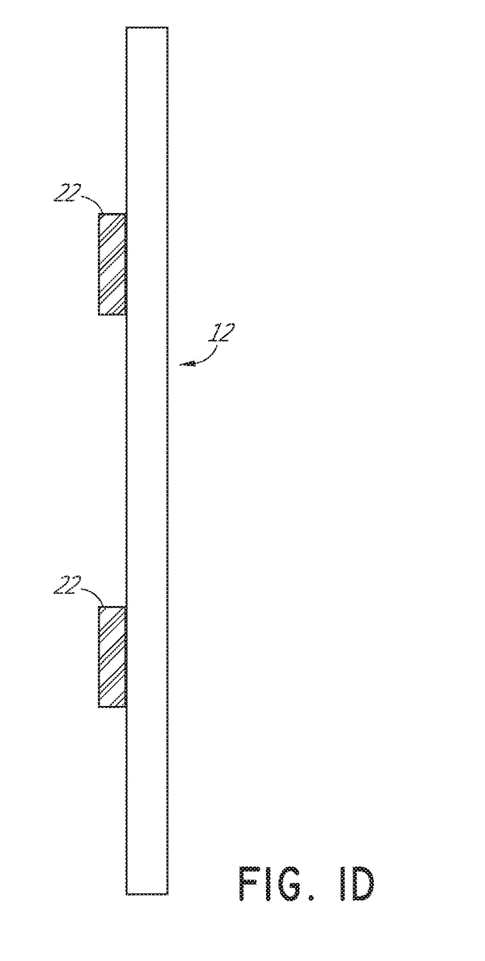
FIG. 1D is a side view of an alternative backing plate having an alternative embodiment of a biasing element of the license plate mounting system.

FIG. 1D illustrates another embodiment of the compensating arrangement that comprises at least one compensating element, such as the biasing element 22. In some configurations, the biasing element 22 can include at least one bumper 22. The bumper 22 can be disposed behind the license plate and secured to the backing plate 12 by a suitable fastener, such as one or more rivets, screws, adhesives and/or the like. Thus, with such an arrangement, the bumper 22 can contact a rear surface of the license plate. The bumper 22 can project a distance outward from the backing plate sufficient to provide a force tending to move the license plate forward towards the outer frame 14 and/or into the frame cavity. Accordingly, in such configurations, the bumper 22 can help eliminate vibration between license plate and the frame. The bumper 22 can help to limit or prevent the rattling of the license plate when the license plate is maintained between the outer frame 14 and the backing plate 12. The bumper 22 can be replaceable in some configurations. The bumper 22 can comprise one or more sizes. The size of the bumper 22 can be dependent on the depth of the mounting plate hardware and/or backing plate and/or system 10.

In some embodiments, the bumper 22 can be made of one or more materials suitable for providing a sufficient force tending to hold the license plate in the proper position. The bumper 22 can also be configured to withstand various weather conditions and resist breakdown by water. The bumper 22 can have a suitable material to prevent decomposition and increase the durability and stability of the system. The bumper 22 can have a suitable material to maintain flexibility yet provide enough rigidity to apply a biasing force against the license plate. In some embodiments, the bumper 22 can provide thermal and moisture insulation to the fasteners and license plate mounting system 10. Accordingly, the material of the bumper 22 can be selected such that the overall cost of producing and replacing the bumper 22 can be reduced. For example, the material of the bumper 22 can include rubber, plastic, neoprene foam, and/or any sponge-like material, among others. In the arrangement of FIG. 1D, the bumpers 22 secured to the backing plate 12 by an adhesive. At least two bumpers 22 are provided and are spaced from one another along a length of the backing plate 12.

FIGS. 2A-3E illustrate various embodiments of the outer frame 14. The outer frame 14 can be made of one or more materials, such as stainless steel, plastic, polymer, 304 Grade stainless steel, carbon fiber, and/or aluminum, among other materials that are suitable for complying with industry standards, withstanding various weather conditions, increasing durability, and decreasing cost. The outer frame 14 can be coated with any suitable surface finish, a polish, a brushed metal, and/or a black powder coating, among other coatings. The coatings can advantageously increase the durability of the outer frame 14, enhance the outer frame 14 for aesthetic purposes, and/or increase the ability to withstand various weather conditions. The outer frame 14 can comprise a thickness of 0.0625, 0.125, 0.1875, 0.250, 0.3125, 0.4375, and/or 0.50 or more inches, for example.

In certain embodiments, the outer frame 14 can be substantially identical. However, some embodiments of the license plate mounting system 10 can comprise an outer frame 14 that comprise various configurations.

For example, FIGS. 2A-2E illustrate an embodiment of the outer frame 14 that includes an extension portion 26. The extension portion 26 can extend from the bottom portion of the outer frame 14 towards an interior space disposed in the center of the perimeter formed by the outer frame 14. The extension portion 26 can be rounded and/or substantially rectangular and/or substantially trapezoidal in some instances. Accordingly, in some configurations, the extension portion can have a top extension side 26A and two or more lateral extension sides 26B. The top extension side 26A can be substantially flat. In some instances, the top extension side 26A can be rounded. The lateral extension sides 26B can extend from the bottom portion of the outer frame 14 at an angle inwardly towards one another. In some configurations the lateral extension sides 26B can extend from the bottom portion of the outer frame 14 at an angle outwardly away from one another. In some configurations the lateral extension sides 26B can extend from the bottom portion of the outer frame 14 at an angle perpendicular to the outer frame.

As illustrated in FIGS. 2A-2E, the extension portion 26 can form a substantially flat portion, such as a display portion 28 that can be configured to display a logo, phrase, and/or other image containing any information. The display portion can be recessed in some embodiments (see FIGS. 2D-2E) and can be configured to receive a name plate 28A. The display portion 28 can include a name plate 28A that can display the logo, phrase, and/or other image containing any information. The name plate 28A can be substantially oval-shaped, rectangular, circular, among other shapes. The extension portion 26 can be sized and shaped such that it can provide enough space to display information, but limit the amount of space that the extension portion 26 covers on the license plate when mounted. This can advantageously allow the user to display a logo or other information while maintaining the integrity of the license plate and comply with the laws and standards of various states.

Figure 2A:
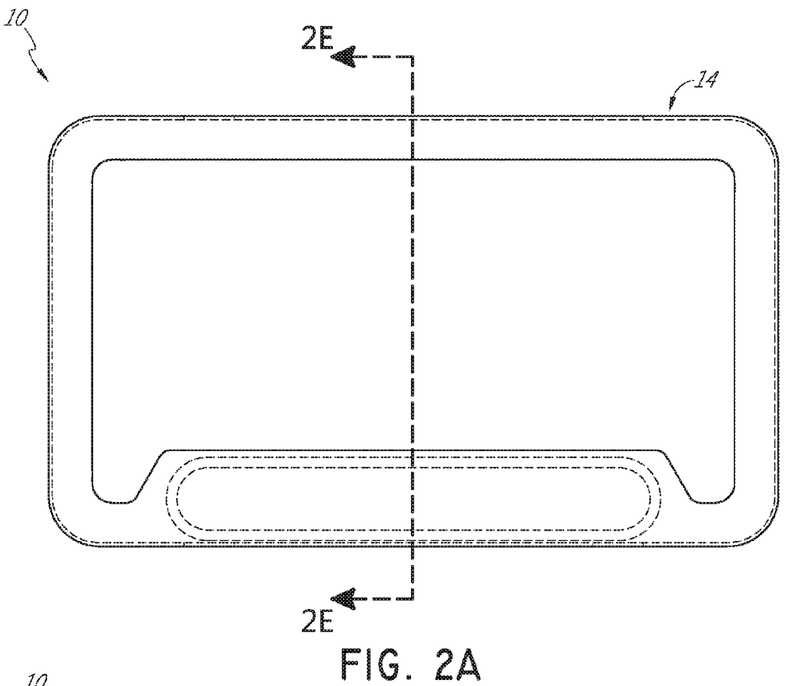
FIG. 2A is a front view of the outer frame of FIG. 1B separate from the backing plate.
Figure 2B:
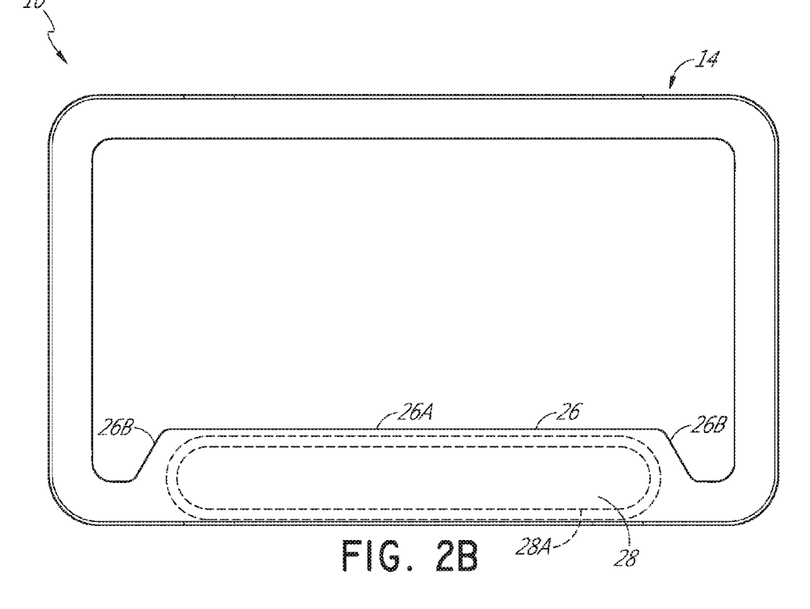
FIG. 2B is a front view of the outer frame of FIG. 2A with certain features identified.
Figure 2C:
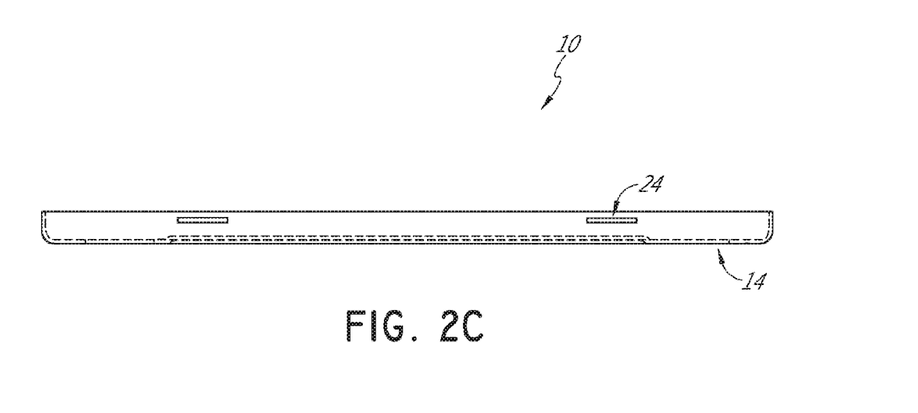
FIG. 2C is a top view of the outer frame of FIG. 2A.
Figure 2D:
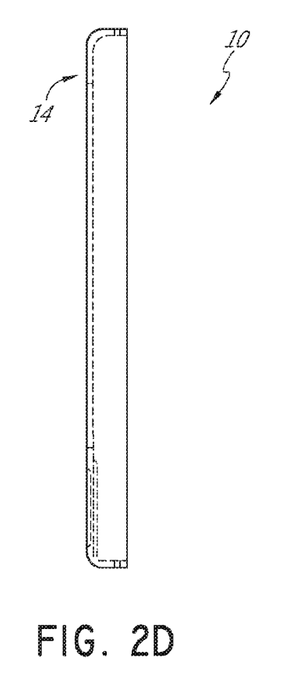
FIG. 2D is a side view of the outer frame of FIG. 2A.
Figure 2E:
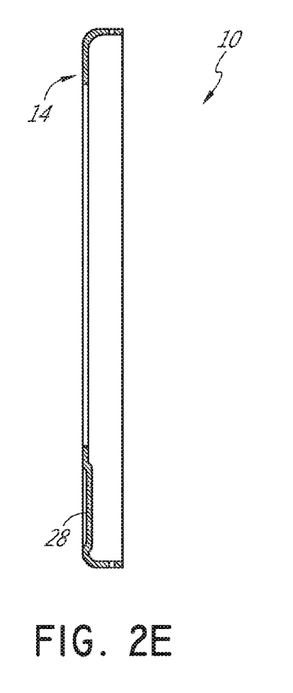
FIG. 2E is a sectional view of the outer frame of FIG. 2A taken along line 2E-2E of FIG. 2A.
Figure 3A:
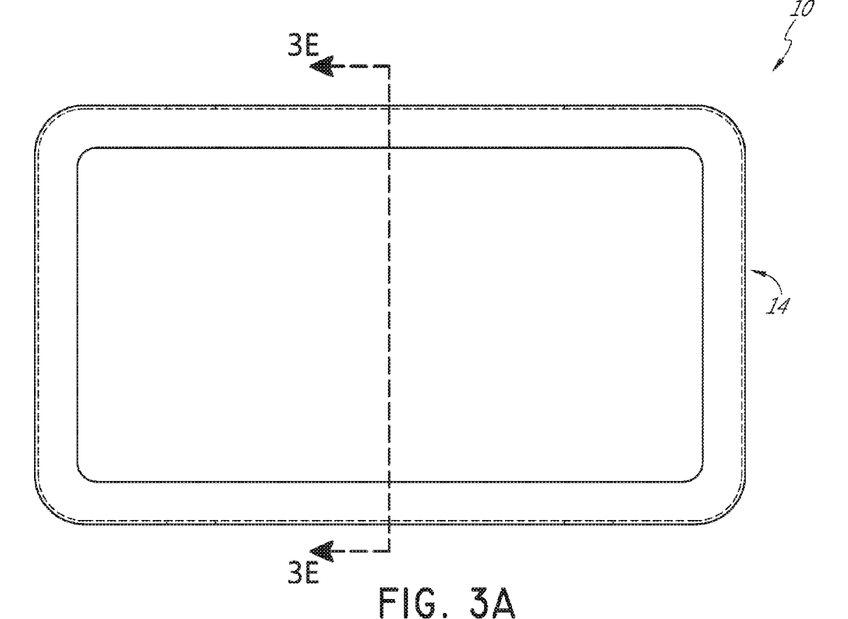
FIG. 3A is a front view of an alternative version of an outer frame.
Figure 3B:
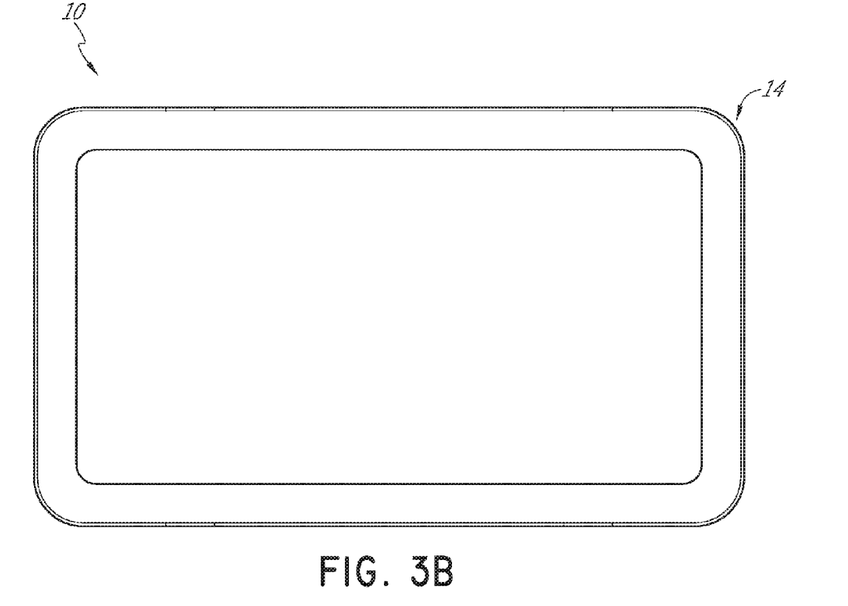
FIG. 3B is another front view of the outer frame of FIG. 3A.
Figure 3C:
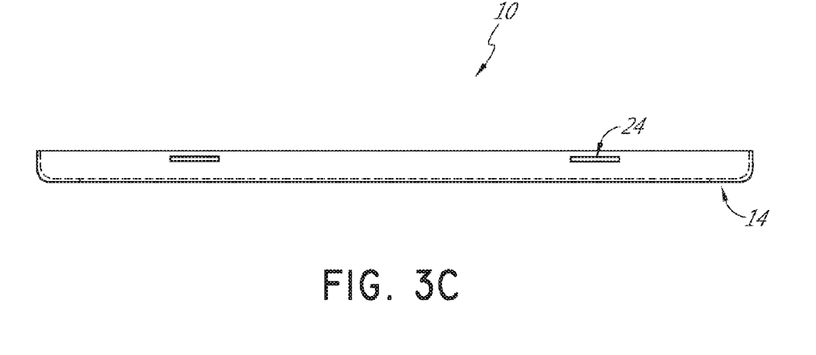
FIG. 3C is a top view of the outer frame of FIG. 3A.
Figure 3D:
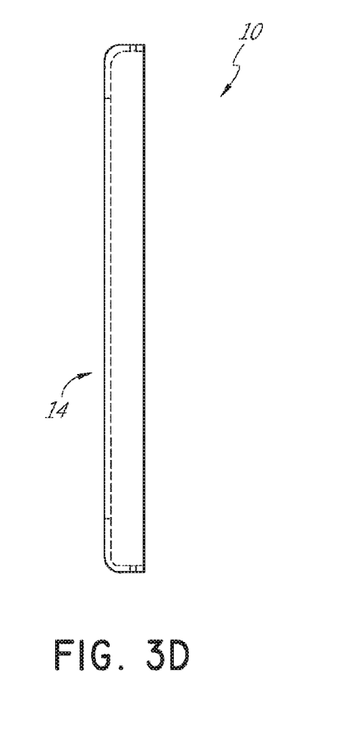
FIG. 3D is a side view of the outer frame of FIG. 3A.
Figure 3E:
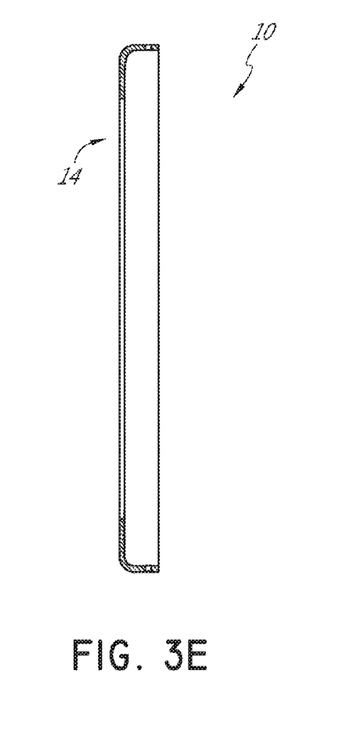
FIG. 3E is a sectional view of the outer frame of FIG. 3A taken along line 3E-3E of FIG. 3A.

As illustrated in FIG. 2C, the outer frame 14 can include one or more slots 24 sized and positioned to cooperate with and receive the tabs 18 of the backing plate 12. Accordingly, the license plate can be positioned between the backing plate 12 and the outer frame 14 (such as within the outer frame 14), and the outer frame 14 can be engaged with the backing plate 12 by moving the outer frame 14 toward the backing plate 12 until the tabs 18 engage the slots 24. In some configurations, to lock the license plate into position, the outer frame 14 can be moved towards the backing plate 12 with enough force to overcome the force applied by the one or more biasing elements 22.

In some embodiments, the outer frame 14 and the backing plate 12 can be configured for an interference fit, such that at least a portion (e.g., the outer rim) of the outer frame 14 elastically deforms (e.g., expands) to pass over the tabs 18 until the tabs 18 enter the slots 24. The amount of deformation can be selected to ensure a reliable connection between the outer frame 14 and the backing plate 12. The material of the outer frame 14 can be selected such that the outer frame 14 can deform and return toward or to its original configuration and maintain a structure that is rigid enough to maintain an engagement between the license plate and the backing plate 12 within the outer frame 14.

With such an arrangement, the backing plate 12 can be secured to the vehicle using suitable fasteners, such as screws and/or rivets. The fastener heads typically will be on the outside of the backing plate 12 (the side facing away from the associated vehicle). The license plate can be positioned between the backing plate 12 and the outer frame 14 and the outer frame 14 can be secured to the backing plate 12. In embodiments comprising the biasing element 22, the biasing element 22 can push the license plate toward the outer frame 14 to compensate for different thicknesses of the fastener heads and/or any other excess space present between the backing plate 12 and the outer frame 14. In at least some configurations, however, the license plate itself is not fastened to the vehicle with fasteners. Rather, only the backing plate 12 is secured to the vehicle with fasteners.

Moreover, because the outer frame 14 is coupled to the backing plate 12 without the use of fasteners, or in a tool-less or edge mount fashion, the width of the outer frame 14 can remain small, which allows exposure of more of the license plate than possible with other systems, such as those that have exposed or external fastener heads. Such an arrangement can facilitate compliance with DMV regulations, such as those pertaining to exposure of registration tags. In particular, in embodiments comprising the biasing element 22, there may not be a need for additional fasteners to secure the license plate within the outer frame 14. As discussed above, the biasing element can apply sufficient biasing force to maintain an engagement between the outer frame 14 and the backing plate 12. This configuration can allow the outer frame 14 to be coupled to the backing plate 12 and to hold the license plate within the rim of the outer frame 14 without the use of additional fasteners.

FIGS. 3A-3E illustrate another embodiment of the outer frame 14 of the system 10. Overall, this embodiment can comprise similar features to the features disclosed herein in other embodiments of the system 10. In the illustrated embodiment, the frame has a constant width along the perimeter of the outer frame 14. In this embodiment, the width of the outer frame 14 can maximize the area of the license plate that can be displayed while the license plate is held between the outer frame 14 and the backing plate 12.

FIGS. 4A-5E illustrate yet another embodiment of the system 10. The embodiments illustrated in FIGS. 4A-5E can include many of the same features disclosed herein in the system 10 illustrated in FIGS. 1A-3E. The system 10 illustrated in FIGS. 4A-5E can include one or more different arrangements for maintaining a license plate between the outer frame 14 and the backing plate 12.

Figure 4A:
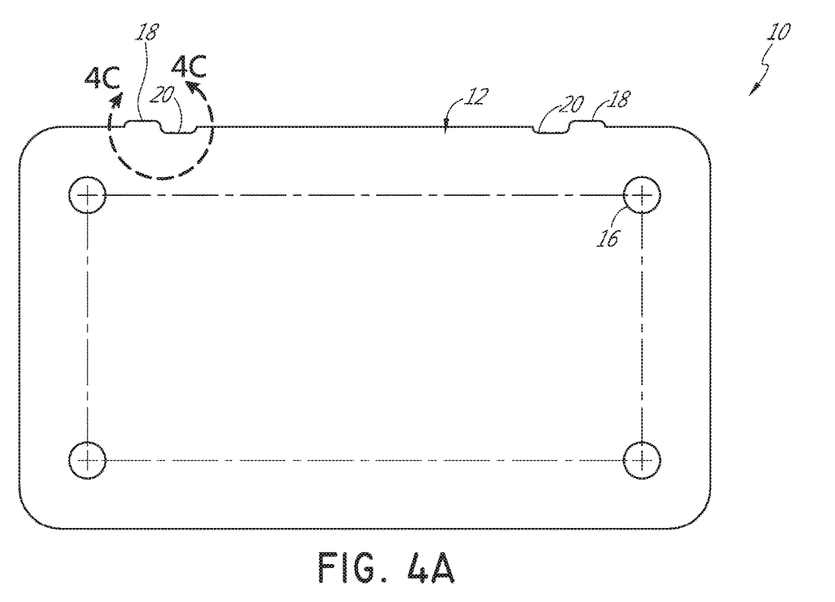
FIG. 4A is a front view of an alternative backing plate.
Figure 4B:
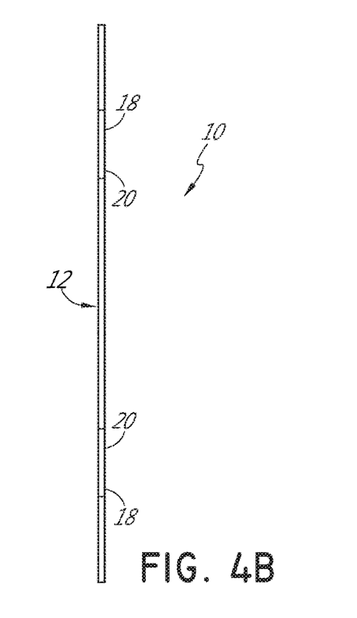
FIG. 4B is a top view of the backing plate of FIG. 4A.
Figure 4C:
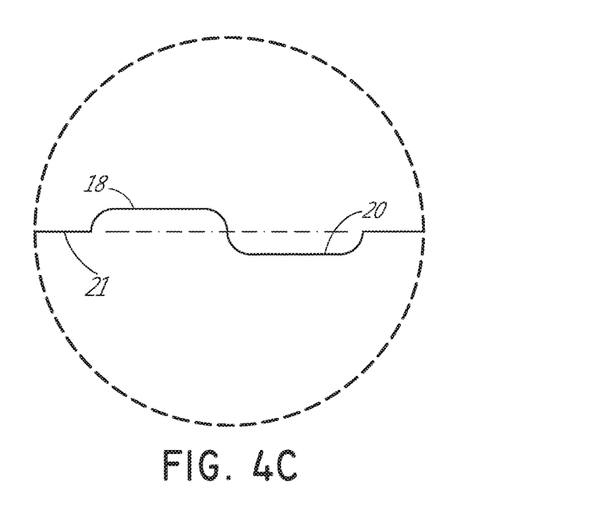
FIG. 4C is an enlarged view of a tab and recess portion of the backing plate of FIG. 4A indicated by the line 4C-4C of FIG. 4A.
Figure 5A:
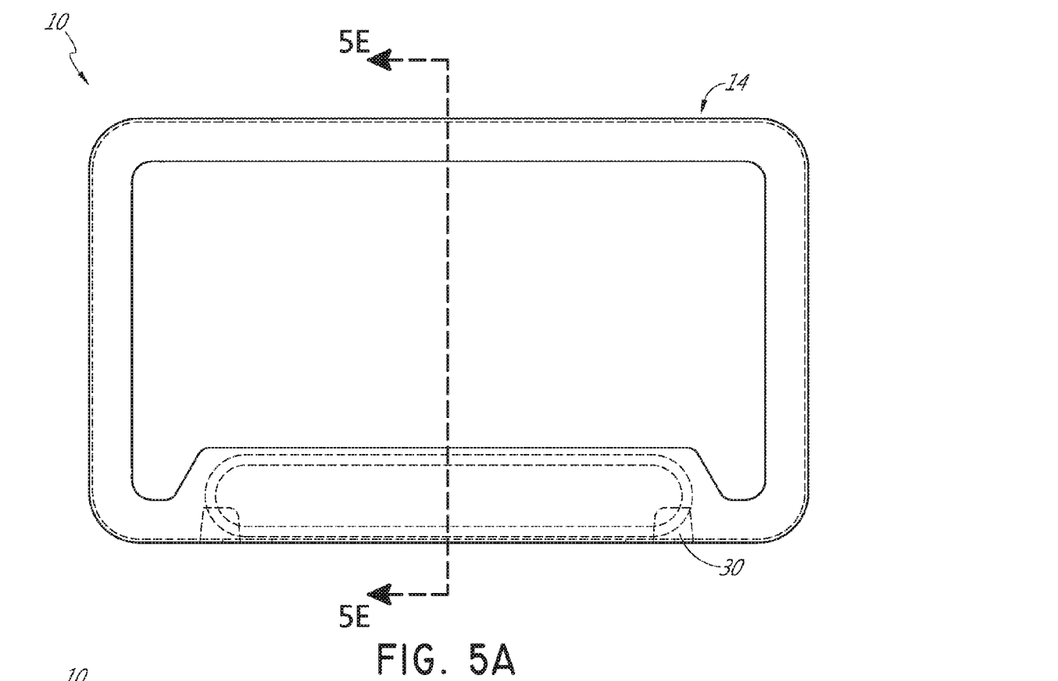
FIG. 5A is a front view of another alternative version of an outer frame.
Figure 5B:
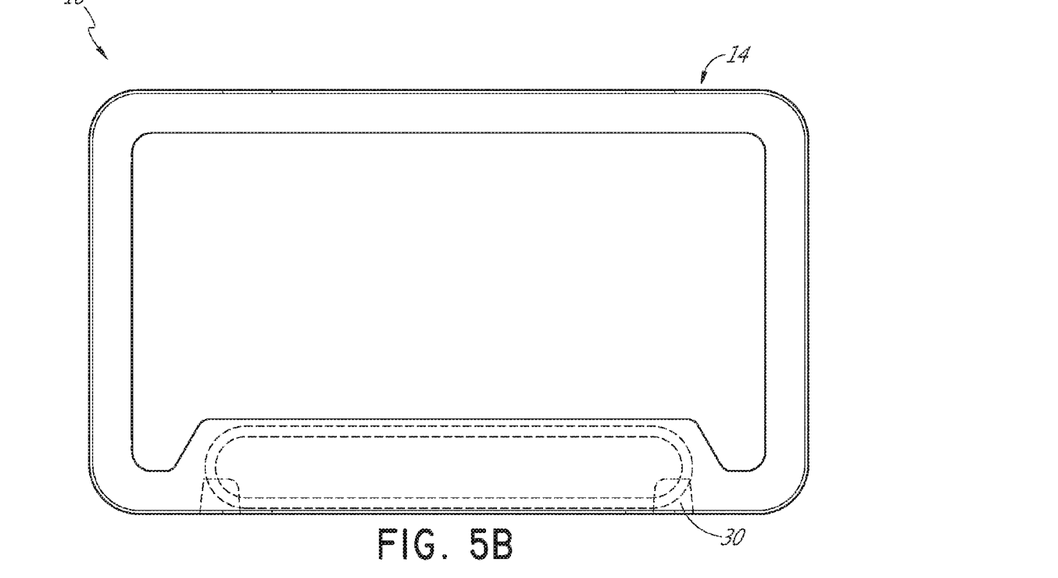
FIG. 5B is another front view of the outer frame of FIG. 5A.
Figure 5C:
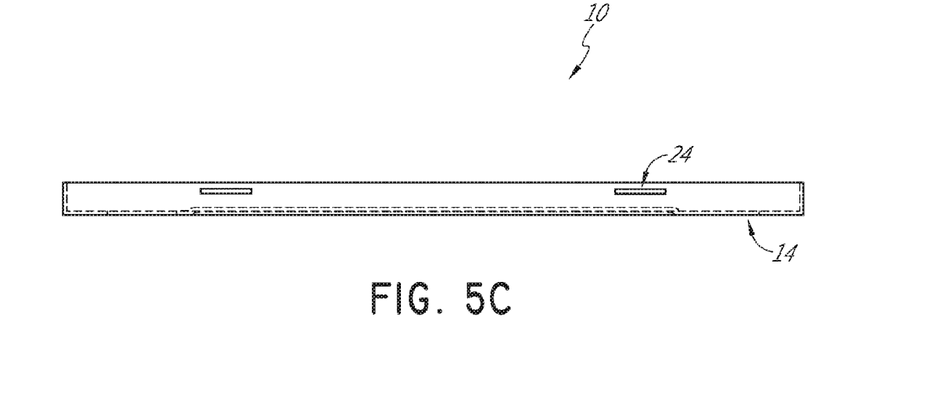
FIG. 5C is a top view of the outer frame of FIG. 5A.
Figure 5D:
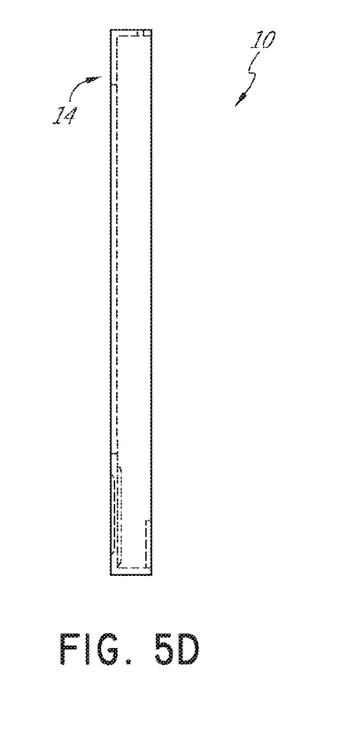
FIG. 5D is a side view of the outer frame of FIG. 5A.
Figure 5E:
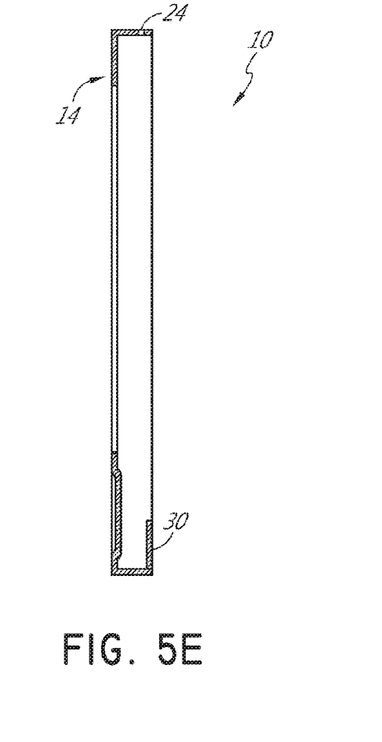
FIG. 5E is a sectional view of the outer frame of FIG. 5A taken along line 5E-5E of FIG. 5A.

For example, FIGS. 4A-4C illustrate several views of an alternative backing plate of a license plate mounting system. FIG. 4A illustrates an embodiment of the system 10. The system 10 can include a tab 18 and slot 24 arrangement on one side (e.g., the upper end) In some embodiments, the system 10 can include one or more different arrangements on the upper end, the lower end, and/or each of the lateral ends of the backing plate 12. FIG. 4B illustrates a top view of the backing plate 12.

FIG. 4C illustrates a close-up view of the tab 18 and recess 20 arrangement disposed along the top side of the outer frame 14. The tab 18 and recess 20 can extend above and below, respectively, of a base edge 21 of the backing plate 12 in a region outside of the tab 18 or recess 20. A projection of the base edge 21 within the region of the tab 18 and recess 20 is shown as a dashed line in FIG. 4C. Similar to the embodiments disclosed herein, the recess 20 can be spaced near or adjacent the tab 18. In some embodiments, the tabs 18 can project outwardly from the upper end of the backing plate 12 at various lengths. The lengths can be advantageously selected to sufficiently extend into and be configured to be securely coupled to the outer frame 14. For example, the tabs can project outwardly 0.0125, 0.0250, 0.0375, 0.0500, 0.0625 0.0750, 0.0875, and/or 0.100 or more inches. The recess 20 can extend a similar distance downwardly into the upper end of the backing plate 12.

FIGS. 5A-5E illustrate several views of an outer frame of the license plate mounting system configured for use in combination with the backing plate of FIG. 4. In the illustrated embodiment, the outer frame 14 comprises a different arrangement for maintaining the license plate within the outer frame 14 on the bottom of the outer frame 14 from the top of the outer frame 14. The system includes the tab 18 and slot 24 arrangement on one side (e.g., the upper end of the system) and a different arrangement on another side (e.g., the lower end of the system). In particular, the slots 24 of the outer frame 14 can be configured to receive the tabs 18 of the backing plate. The tabs 18 can be snapped and/or slid into place within the perimeter of the slot 24. In the illustrated embodiment, the lower edge of the backing plate 12 can omit the tabs 18 and slots 24 of the upper end. Instead, the lower end of the outer frame 14 can include one or more (e.g., a pair of) tabs 30 spaced rearwardly from a front wall of the outer frame 14 and extending generally parallel thereto (see FIG. 5E). The tabs 30 can extend in a hook-like manner behind the outer frame 14. For example, the tabs 30 can have a flat portion that is perpendicular to the outer frame 14 and a vertical portion that extends vertically from the end of the flat portion.

The tabs 30 can be configured to receive the license plate and backing plate 12 between the tabs 30 and the front wall of the outer frame 14. The upper end of the outer frame 14 can then be coupled to the upper edge of the backing plate 12 by the tabs 18 and slots 24 in a manner similar to the system 10 of FIGS. 1A-3E. The arrangements described herein can be disposed along any side of the outer frame 14 and/or backing plate 12.

The dimensions of the components of the system 10 described herein are by way of example only. Such dimensions are well-suited for current motorcycle license plate standards in use in the United States. These dimensions could be modified to make the system 10 useful with other standards for license plate applications, such as US and European automotive plates, or other applications. In addition to the specific dimensions, the proportions or other relationships created by the specific dimensions also form a part of the present disclosure.

The materials of the components described herein can be selected to comply with standards and requirements of various jurisdictions. The materials can advantageously be weather-proof or be selected to withstand various weather conditions. The materials can be selected to be durable, flexible, rigid, and/or decrease the overall cost of the system.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A license plate mounting system comprising:
    a backing plate comprising:
        an upper plate edge extending along an upper width of the backing plate, the upper plate edge comprising an upper base edge portion, at least one raised tab and at least one recess disposed laterally adjacent to the at least one raised tab along the upper width, wherein the at least one recess extends below the upper base edge portion of the upper plate edge;
        a lower plate edge comprising a lower base edge portion, at least one raised tab and at least one recess disposed adjacent to the at least one raised tab, wherein the at least one recess extends above the lower base edge portion of the lower plate edge;
        a plurality of holes each configured to receive a fastener; and
        a biasing element supported by the backing plate; and
    an outer frame comprising:
        an upper frame edge comprising at least one slot configured to receive the at least one raised tab of the upper edge of the backing plate, wherein the at least one raised tab of the upper edge is configured to couple the backing plate with the outer frame;
        a lower frame edge comprising at least one slot configured to receive the at least one raised tab of the lower edge of the backing plate, wherein the at least one raised tab of the lower edge is configured to couple the backing plate with the outer frame,
    wherein the biasing element is configured in use to apply a force to a license plate positioned between the backing plate and the outer frame, the force tending to move the license plate toward a front wall of the outer frame, and
    wherein the at least one recess disposed on the upper plate edge and the at least one recess disposed on the lower plate edge are accessible while the backing plate is coupled to the outer frame.

2. The license plate mount of claim 1, wherein the biasing element comprises a bumper projecting outwardly from the backing plate.

3. The license plate mount of claim 1, wherein the biasing element comprises neoprene foam.

4. The license plate mount of claim 1, wherein the biasing element extends across a front surface of the backing plate.

5. The license plate mount of claim 1, wherein the biasing element is offset from a central horizontal axis of the backing plate.

6. The license plate mount of claim 1, wherein the biasing element is coupled to the backing plate by one or more fasteners.

7. The license plate mount of claim 1, wherein the biasing element comprises a spring mechanism.

8. The license plate mount of claim 1, wherein the outer frame comprises a uniform width.

9. The license plate mount of claim 1, wherein the lower frame edge of the outer frame further comprises an extension portion, wherein the extension portion extends inwardly towards an interior of the outer frame from the lower frame edge.

10. The license plate mount of claim 9, wherein the extension portion further comprises a recess configured to receive a display plate.

11. The license plate mount of claim 10, wherein the extension portion further comprises a display plate configured to display information.

12. The license plate mount of claim 1, wherein the at least one raised tab and the at least one recess are laterally aligned along a plane.

13. The license plate mount of claim 1, wherein the at least one raised tab extends along only a portion of the upper width of the backing plate and the at least one recess extends along only a portion of the upper width of the backing plate.

14. The license plate mount of claim 1, wherein the at least one raised tab comprises a first tab and a second tab spaced apart from the first tab along the upper width of the backing plate.

15. The license plate mount of claim 14, wherein the at least one recess comprises a first recess disposed laterally adjacent to the first tab along the upper width and a second recess disposed laterally adjacent to the second tab along the upper width.

16. A license plate mounting system comprising:
    a backing plate comprising:
        an upper plate edge comprising at least one raised tab and at least one recess disposed adjacent to the at least one raised tab, wherein the at least one recess extends below an upper base edge portion of the upper plate edge;
        a lower plate edge;
        a plurality of holes each configured to receive a fastener;
        a biasing element supported by the backing plate;
    an outer frame comprising:
        an upper frame edge comprising at least one slot configured to receive the at least one raised tab of the upper edge of the backing plate, wherein the at least one slot extends through the upper frame edge;
        a lower frame edge comprising at least one frame tab spaced rearwardly from a front wall of the outer frame, wherein the at least one frame tab is configured to receive the backing plate and the license plate disposed between the front wall of the outer frame and the backing plate; and
    wherein the biasing element is configured in use to apply a force to a license plate positioned between the backing plate and the outer frame, the force tending to move the license plate toward the front wall of the outer frame.

17. The license plate mount of claim 16, wherein the biasing element comprises a bumper projecting outwardly from the backing plate.

18. The license plate mount of claim 16, wherein the biasing element comprises neoprene foam.

19. The license plate mount of claim 16, wherein the biasing element extends across a front surface of the backing plate and is offset from a central horizontal axis of the backing plate.

20. The license plate mount of claim 16, wherein the outer frame comprises a uniform width.

21. The license plate mount of claim 16, wherein the lower frame edge of the outer frame further comprises an extension portion, wherein the extension portion extends inwardly towards an interior of the outer frame from the lower frame edge.

22. The license plate mount of claim 21, wherein the extension portion further comprises a recess configured to receive a display plate.

23. The license plate mount of claim 22, wherein the extension portion further comprises a display plate configured to display information.

24. The license plate mount of claim 16, wherein the at least one frame tab comprises a pair of frame tabs spaced from one another in a width direction of the outer frame.

25. The license plate mount of claim 16, wherein the at least one slot extends along only a portion of the upper frame edge.

26. The license plate mount of claim 16, wherein the at least one slot comprises a first slot and a second slot spaced apart from the first slot along the upper frame edge.

* * * * *